(12) United States Patent
Kawakami et al.

(10) Patent No.: US 9,938,194 B2
(45) Date of Patent: Apr. 10, 2018

(54) ALUMINA-BASED FILLING SAND FOR SLIDING NOZZLE

(71) Applicant: YAMAKAWA SANGYO CO., LTD., Amagasaki-shi, Hyogo (JP)

(72) Inventors: Manabu Kawakami, Amagasaki (JP); Yoshikatsu Nishida, Amagasaki (JP)

(73) Assignee: YAMAKAWA SANGYO CO., LTD., Hyogo (JP)

( * ) Notice: Subject to any disclaimer, the term of this patent is extended or adjusted under 35 U.S.C. 154(b) by 0 days.

(21) Appl. No.: 15/120,600

(22) PCT Filed: Mar. 24, 2015

(86) PCT No.: PCT/JP2015/001674
§ 371 (c)(1),
(2) Date: Aug. 22, 2016

(87) PCT Pub. No.: WO2015/146157
PCT Pub. Date: Oct. 1, 2015

(65) Prior Publication Data
US 2017/0066689 A1    Mar. 9, 2017

(30) Foreign Application Priority Data
Mar. 26, 2014    (JP) ................. 2014-064582

(51) Int. Cl.
C04B 35/117    (2006.01)
B22D 41/46    (2006.01)
C04B 35/18    (2006.01)
(Continued)

(52) U.S. Cl.
CPC ............ C04B 35/117 (2013.01); B22D 41/22 (2013.01); B22D 41/46 (2013.01); C04B 35/18 (2013.01);
(Continued)

(58) Field of Classification Search
CPC ......... C04B 28/02; C04B 28/04; C04B 14/42; C04B 14/48; C04B 16/06; C04B 20/008;
(Continued)

(56) References Cited

U.S. PATENT DOCUMENTS 4,928,931 A    5/1990    Dislich et al.
5,646,199 A *  7/1997    Yoshida .................... B22C 1/22
                                              523/139
(Continued)

FOREIGN PATENT DOCUMENTS

DE    19738503    *    3/1999    ............. B22D 41/46
DE    19738503 A1    3/1999
(Continued)

OTHER PUBLICATIONS

European Patent Office, International Search Report issued in corresponding Application No. PCT/JP2015/001674, dated Jul. 20, 2015.

*Primary Examiner* — Noah S Wiese
(74) *Attorney, Agent, or Firm* — Stites & Harbison, PLLC; Jeffrey A. Haeberlin; Rachel D. Rutledge

(57) ABSTRACT

An alumina-based filling sand for sliding nozzle comprising at least 50 wt % of mixed sand including 20 to 90 vol % of alumina sand and 80 to 10 vol % of silica sand, wherein the alumina sand has surface irregularities of 1.3 or less and comprises 50 wt % or more of an $Al_2O_3$ component.

7 Claims, 3 Drawing Sheets

(51) Int. Cl.
  *B22D 41/22* (2006.01)
  *C21C 5/46* (2006.01)
(52) U.S. Cl.
  CPC ............. *C04B 2235/3201* (2013.01); *C04B 2235/3206* (2013.01); *C04B 2235/3208* (2013.01); *C04B 2235/3217* (2013.01); *C04B 2235/3243* (2013.01); *C04B 2235/3272* (2013.01); *C04B 2235/3418* (2013.01); *C04B 2235/422* (2013.01); *C04B 2235/5427* (2013.01); *C04B 2235/72* (2013.01); *C04B 2235/9676* (2013.01); *C21C 5/4653* (2013.01)
(58) Field of Classification Search
  CPC ... C04B 24/04; C04B 24/122; C04B 24/2647; C04B 14/06; C04B 18/146; C04B 24/06; C04B 24/2658
  See application file for complete search history.

(56) References Cited

U.S. PATENT DOCUMENTS 6,316,106 B1* 11/2001 Takasugi ................ B22D 41/46
  428/402
2009/0239977 A1* 9/2009 Dubey .................... C04B 28/02
  524/5

FOREIGN PATENT DOCUMENTS

| EP | 0 846 512 A1 | 6/1998 | |
|---|---|---|---|
| EP | 1 201 336 A1 | 5/2002 | |
| JP | H08-103864 A | 4/1996 | |
| JP | 2006334612 A * | 12/2006 | ............ B22C 9/02 |
| WO | 97/05978 A1 | 2/1997 | |

* cited by examiner

[Fig. 1]
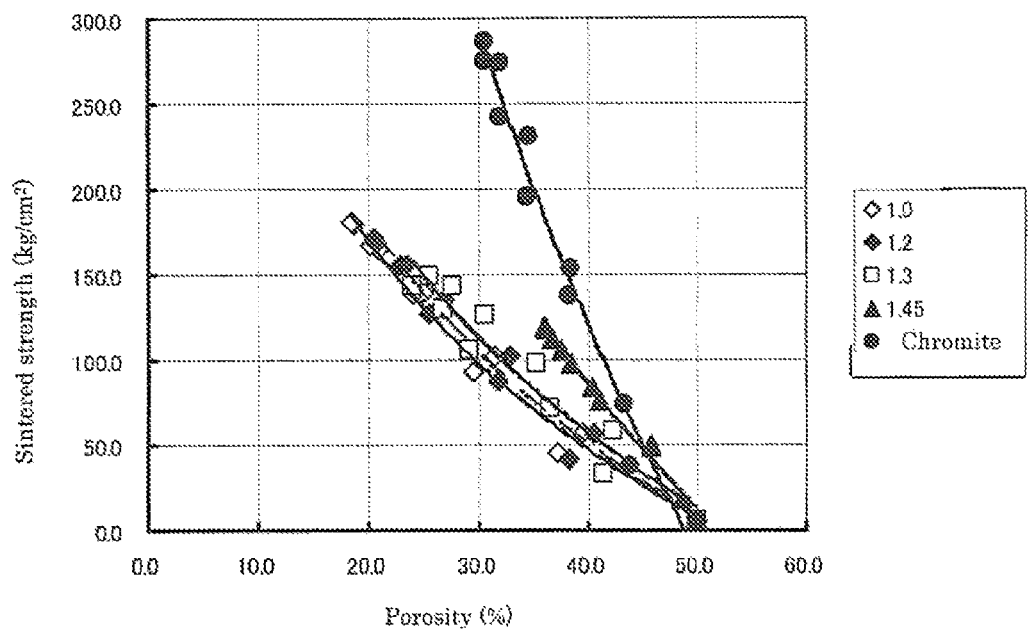
[Fig. 2]
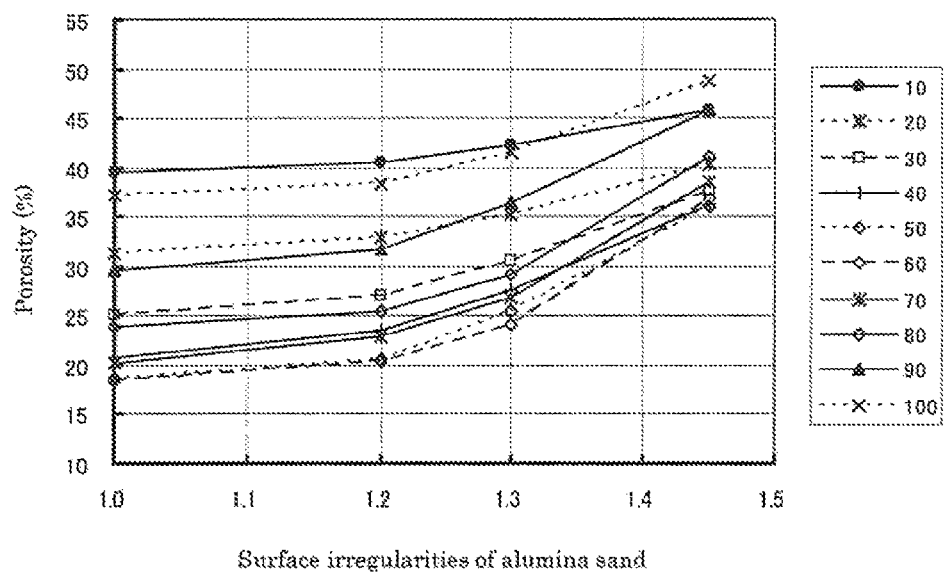

[Fig. 3]
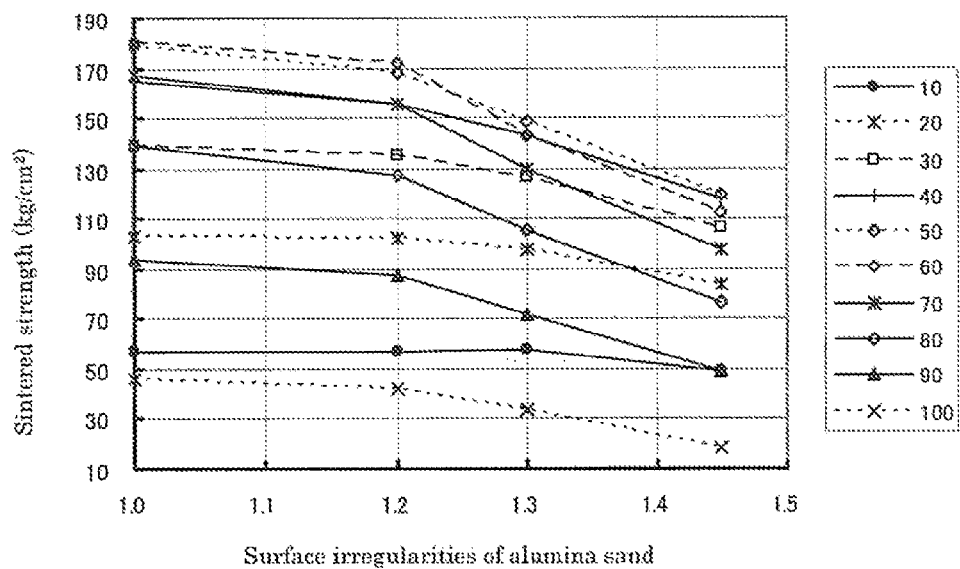
[Fig. 4]
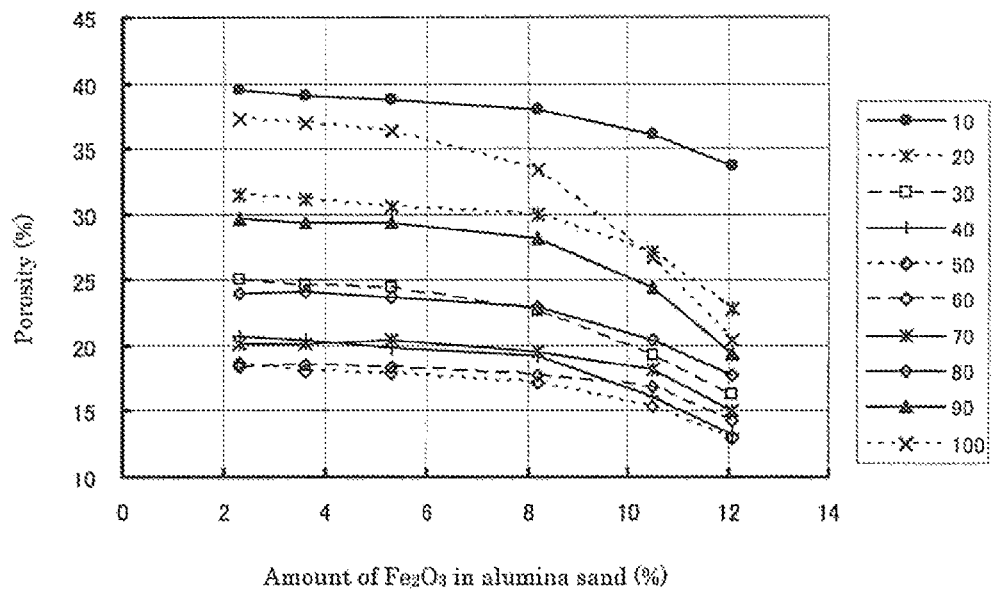

[Fig. 5]
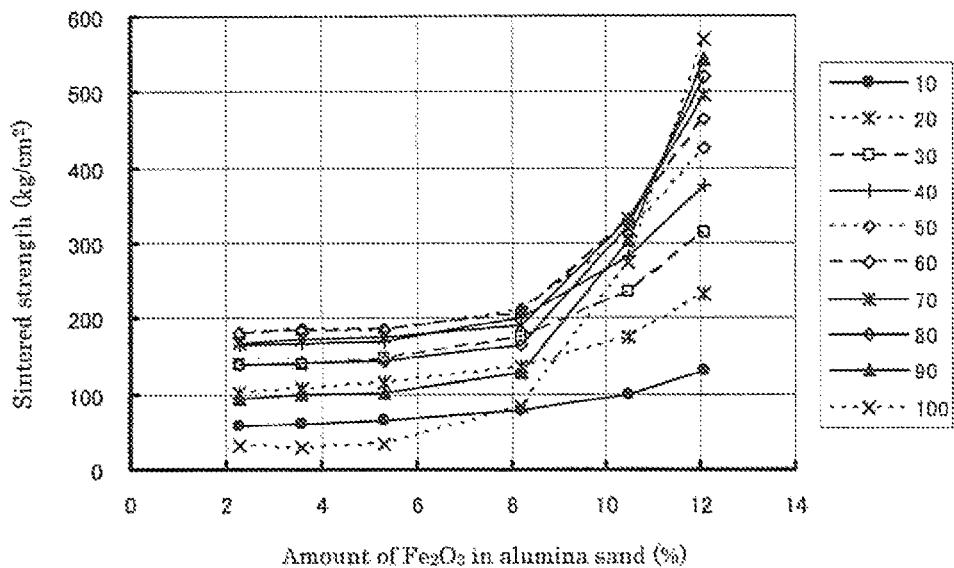
[Fig. 6]
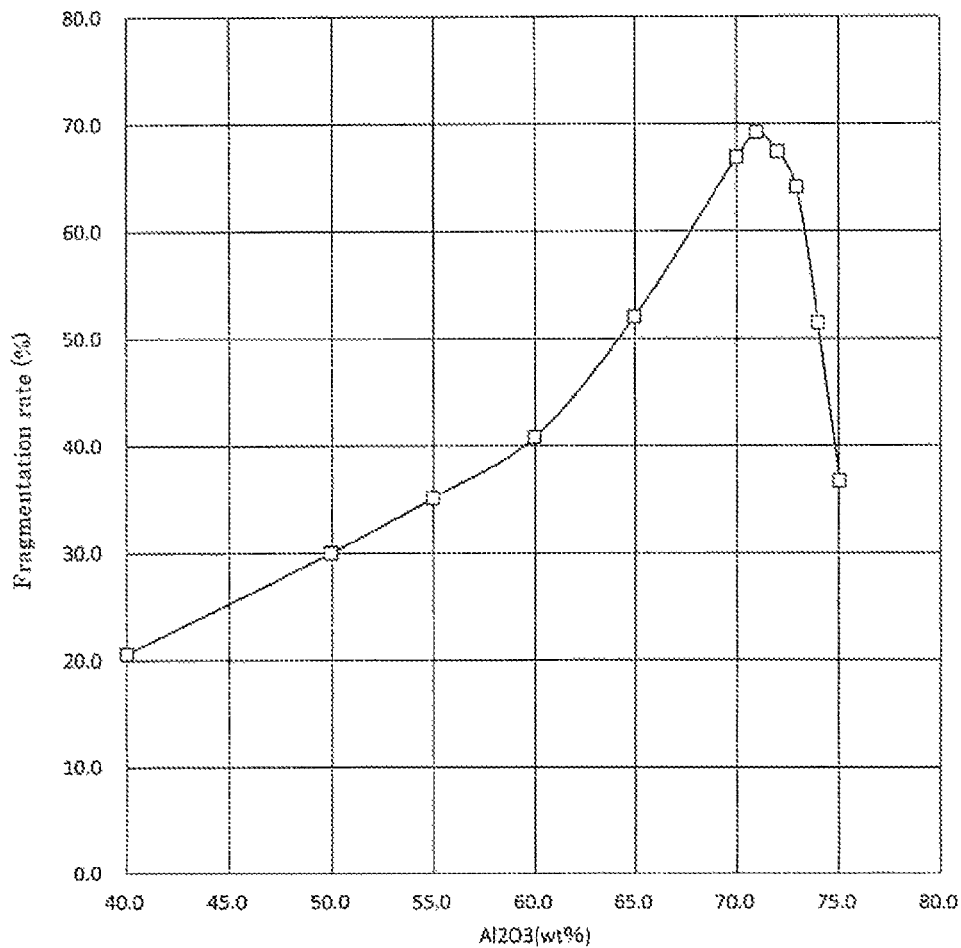

ALUMINA-BASED FILLING SAND FOR SLIDING NOZZLE

TECHNICAL FIELD

The present invention relates to alumina-based filling sand for sliding nozzle. More specifically, the present invention relates to the alumina-based filling sand for sliding nozzle that forms an opening where the filling sand falls through smoothly without being molten and sintered by a molten metal (molten steel) poured into a ladle used in a steel mill and that does not allow the molten steel to permeate into the filling sand (in other words, the sand itself in a sliding nozzle is not melted and sintered by the molten steel and does not allow the molten steel to permeate into gaps between sand particles).

BACKGROUND ART

A ladle for receiving molten steel is provided with a sliding nozzle. The ladle provided with the sliding nozzle is filled with fire-resistant sand (also known as filling sand for sliding nozzle or simply as filling sand) before receiving the molten steel poured thereinto so that the molten steel is prevented from coagulating in the nozzle.

Known as the traditional filling sand is mixed sand comprising silica sand and chromite sand (see Patent Document 1: International Publication WO 97/05978). It is relatively unusual for this mixed sand to form a sintered sand layer because of the molten steel and to make non-opening in the nozzle. The mixed sand, however, has become desired nowadays to avoid the non-opening in the nozzle with a probability (hereinafter referred to as a free opening ratio) as close as 100% because the non-opening in the nozzle could cause many problems with continuous casting operations of a facility.

CITATION LIST

Patent Literature

[PTL 1] International Publication WO 97/05978

SUMMARY OF INVENTION

Technical Problem

It has been desired that the traditionally used filling sand for sliding nozzle improves in free opening ratio because its free opening ratio has not been sufficient.

Solution to Problem

The inventors of the present invention observed the following problem with the mixed sand comprising the silica sand and the chromite sand: Iron oxide of the chromite sand and silica of the silica sand reacted with the molten steel and formed a densely sintered sand layer. This sintered sand layer was high in strength and was hard to crack, resulting in non-opening of the mixed sand. The inventors of the present invention then unexpectedly found the following: Using alumina sand having specific surface irregularities in filling sand decreases gaps between filling-sand particles; and this decrease in gaps does not inhibit retainment of molten steel and does not inhibit opening of the mixed sand at the right time even though an amount of a sintered sand layer (hereinafter referred to as a sintering amount) is much less than traditionally thought to be necessary.

The present invention provides alumina-based filling sand for sliding nozzle comprising at least 50 wt % of mixed sand including 20 to 90 vol % of alumina sand and 80 to 10 vol % of silica sand, wherein the alumina sand has surface irregularities of 1.3 or less and comprises 50 wt % or more of an $Al_2O_3$ component.

Advantageous Effects of Invention

The alumina-based filling sand for sliding nozzle of the present invention is capable of forming a sintered sand layer low in sintering amount and easily crackable even at high temperatures and/or at the time of refining the molten steel for a prolonged time, resulting in a high free opening ratio of the filling sand.

The alumina sand having 8 wt % or less of $Fe_2O_3$ is capable of having a higher free opening ratio.

The alumina sand having an average particle diameter within a range from 0.2 to 1.0 mm is capable of having a higher free opening ratio.

The silica sand having an average particle diameter within a range from 0.2 to 1.0 mm is capable of having a higher free opening ratio.

The silica sand and the alumina sand both coated with carbon, or either the silica sand or the alumina sand coated with carbon is capable of having a higher free opening ratio.

The alumina sand having surface irregularities of 1.2 or less is capable of having a higher free opening ratio.

BRIEF DESCRIPTION OF DRAWINGS

FIG. 1 is a graph showing a relation between porosity and sintered strength of alumina-based filling sand for sliding nozzle of Example 1 comprising alumina sand having various surface irregularities.

FIG. 2 is a graph showing a relation between the surface irregularities of the alumina sand in the alumina-based filling sand for sliding nozzle of Example 1 and the porosity of the alumina-based filling sand for sliding nozzle.

FIG. 3 is a graph showing a relation between the surface irregularities of the alumina sand in the alumina-based filling sand for sliding nozzle of Example 1 and the sintered strength of the alumina-based filling sand for sliding nozzle.

FIG. 4 is a graph showing a relation between an amount of $Fe_2O_3$ in alumina sand included in alumina-based filling sand for sliding nozzle of Example 2 and porosity of the alumina-based filling sand for sliding nozzle.

FIG. 5 is a graph showing a relation between the amount of $Fe_2O_3$ in the alumina sand included in the alumina-based filling sand for sliding nozzle of Example 2 and sintered strength of the alumina-based filling sand for sliding nozzle.

FIG. 6 is a graph showing a relation between an amount of $Al_2O_3$ in alumina sand of Example 5 and a fragmentation rate of alumina-based filling sand for sliding nozzle.

DESCRIPTION OF EMBODIMENTS

Alumina-based filling sand for sliding nozzle of the present invention (also referred to simply as filling sand) comprises at least 50 wt % of mixed sand including alumina sand and silica sand, the alumina sand having specific surface irregularities and being considered as a specific component. The present invention provides the filling sand having an effect (improvement in free opening ratio) because of the at least 50 wt % of the mixed sand including the silica sand and the alumina sand having the specific surface irregularities and being as the specific component. As for a ratio of the mixed sand, 60 wt % or more is preferable; and 80 wt % or more is more preferable. The ratio of the mixed sand may be 100 wt %.

The alumina sand has a ratio of 20 to 90 vol %, and the silica sand has a ratio of 80 to 10 vol %. The alumina sand having a ratio of less than 20 vol % or a ratio of more than 90 vol % causes an increase in gaps between the filling-sand particles and an increase in molten-steel permeation quantity, with the result that the free opening ratio may not improve. As for the ratios of the both sands, 25 to 85 vol % and 75 to 15 vol % are preferable; and 25 to 70 vol % and 75 to 30 vol % are more preferable.

(Alumina Sand)

In the filling sand, the alumina sand having the surface irregularities of 1.3 or less is used. Surface irregularities are indexes indicating degrees of roundness of sand particles, and an index "1" indicates a shape of a ball. Particles of the alumina sand used in the filling sand are relatively round in shape. Such particles decrease the gaps between the filling-sand particles. The alumina sand having the surface irregularities of more than 1.3 has difficulty in decreasing the gaps and causes a decrease in free opening ratio. The preferable surface irregularities are 1.25 or less, and the more preferable surface irregularities are 1.2 or less.

In the alumina sand, the sand having 50 wt % or more of an $Al_2O_3$ component is used. The alumina sand comprising 50 wt % or more of the $Al_2O_3$ component inhibits an increase in sintering amount, resulting in improvement in the free opening ratio. As for an amount of the $Al_2O_3$ component, 60 wt % or more is preferable; and 70 wt % or more is more preferable.

As long as the alumina sand meets the conditions above—the surface irregularities and the amount of the $Al_2O_3$ component, either natural sand or artificial sand may be used as the alumina sand.

As for an average particle diameter of the alumina sand, 0.2 to 1.0 mm is preferable; and 0.3 to 0.8 mm is more preferable. As for particle size distribution of the alumina sand, a range from 0.150 to 1.180 mm is preferable; and a range from 0.212 to 1.180 mm is more preferable.

(Silica Sand)

The silica sand is not particularly limited, and any publicly known silica sand may be used. Used as the silica sand is natural sand such as Australian Fremantle sand or Iide silica sand from Japan.

As for surface irregularities of the silica sand, 1.45 or less is preferable; and 1.3 or less is more preferable.

As for an average particle diameter of the silica sand, 0.2 to 1.0 mm is preferable; and 0.3 to 0.8 mm is more preferable. As for particle size distribution of the silica sand, a range from 0.150 to 1.180 mm is preferable; and a range from 0.212 to 1.180 mm is more preferable.

(Amount of $Fe_2O_3$)

As for an amount of $Fe_2O_3$ in the alumina sand, 8 wt % or less is preferable; and 5 wt % or less is more preferable.

The alumina sand having a specific amount of $Fe_2O_3$ may be obtained, for example, by selecting suitably from natural alumina sands different in amount of $Fe_2O_3$ or by reducing an alumina raw material having a specific amount of $Fe_2O_3$ to sand by a melting and air-granulation method or the like. The alumina sand obtained by the latter technique will be hereinafter referred to as alumina artificial sand.

As for an amount of $Fe_2O_3$ in the silica sand, 3 wt % or less is preferable; and 1 wt % or less is more preferable.

The lesser amount of $Fe_2O_3$ in the alumina sand and in the silica sand is more preferable, and a minimum amount of $Fe_2O_3$ is 0 wt %.

(Other Sands)

Besides the alumina sand and the silica sand, the filling sand may comprise other sands such as chromite sand and zircon sand.

(Method for Adjusting Mixed Sand)

To make qualities (such as the surface irregularities and the particle diameters) of the alumina sand, the silica sand, and the optional sands consistent, each of the sands may be subjected to grinding processing. Regardless of being subjected to the grinding processing, two or more types of the sands may be mixed.

For the grinding processing, either a publicly known dry process or wet process may be used.

For the dry process, any one of the following devices, for example, may be used: a pneumatic scrubbing device (e.g., a sand reclamation device) in which the raw material sands are ascended inside the device by high-speed airflow and collide with a collision plate so that particles of the raw material sands are ground by collisions and friction against each other; a high-speed scrubbing device in which the raw material sands are poured onto a rapidly spinning rotor inside the device so that the poured sands and the ejected sands from the spinning rotor by centrifugal force are ground by collisions and friction against each other; and a high-speed mixer (e.g., an agitation mill) in which sand particles are subjected to grinding processing inside the mixer and are ground by friction against each other.

For the wet process, a trough-type grinding machine may be used, the grinding machine subjecting sand particles to grinding processing inside the trough having spinning blades.

For the grinding processing, it is preferable to use the wet process. This is because the wet process is capable of removing small particles of the sands produced by the grinding processing simultaneously by rinsing the sands. The dry process, however, is also capable of removing small particles of the sands by using an additionally-installed water washing device.

(Carbon Coating)

The silica sand or the alumina sand, or the silica sand and the alumina sand may be coated with carbon on surfaces thereof. The optional sands may also be coated with the carbon on surfaces thereof. Types of the carbon are not particularly limited, and publicly known carbon may be used. It is, however, preferable to use granular carbon black for hygienic reasons and/or in view of capabilities and cost of a filler. As for granular particles, it is desirable to use those granulated by a dry process or a wet process. As for particle size distribution of the granular particles, 2,000 μm or less is preferable; and 250 to 2,000 μm is more preferable.

How to coat the sand(s) with the carbon is not particularly limited, and the following is one example: The silica sand or the alumina sand (or the optional sands) are stirred and charged individually by separate ribbon-type blenders or simultaneously by the same ribbon-type blender; and then the carbon black is added to and stirred with the sand(s) so that the sand(s) is/are statically coated with the carbon black. Stirring the filler produces a potential of static electricity having an amount of the static electricity comparable to potentials of −0.1 kV or more; however, the preferable potential is within a range from −0.1 to −0.05 kV. The filler having the potentials of −0.1 kV or more enables the filling sand to have substantially no free carbon. In addition, stirring the filler enables the filling sand to be statically coated with the carbon black on its entire surface or part of its surface.

The amount of the carbon black is determined in such a way as to decreases generation of the free carbon, and to obtain the filler having desired properties. More specifically, it is preferable that the amount of the carbon black is 0.1 to 3.0 wt % with respect to amounts of yet-to-be-coated sands; and the amount of 0.1 to 1.0 wt % is more preferable.

The amount of the carbon black exceeding 3.0 wt % with respect to the amounts of the yet-to-be-coated sands causes difficulty in forming a sintered sand layer because of actions of the carbon, resulting in non-opening of the filling sand. Moreover, the high amount of the carbon black promotes recarburization during preparation of ultralow-carbon steel, possibly resulting in problems with composition of the molten steel.

(Usage of Filling Sand)

A shape of a sliding nozzle where the filling sand falls through and types of molten steel are not particularly limited.

The filling sand comprises the alumina sand, the silica sand, and the optional sands. The sliding nozzle may be filled with the optional sands that are poured individually or thoroughly mixed in advance. The thoroughly-mixed optional sands have the advantage of improving workability.

EXAMPLES

In Examples below, properties of the filling sand—particle size distribution, an average particle diameter, surface irregularities, chemical components, porosity, and sintered strength—were measured as follows.

(Particle Size Distribution)

Particle size distribution is indicated by a value measured by a test method for molding sand prescribed by JIS Z 2601.

Under the test method, the particle size distribution of 1.180 to 0.106 mm means that sand particles are not left on a sieve having an opening of 1.180 mm and are left on a sieve having an opening of 0.106 mm.

(Average Particle Diameter)

An average particle diameter is indicated by a value of 50% particle diameter $D_{50}$ (mm) obtained from a particle size accumulation curve prescribed by a particle size test method of soil for JIS A 1204.

(Surface Irregularities)

Surface irregularities are obtained by analyzing a two-dimensional projection of sand particles whose images are projected one by one so as to make a calculation as follows: Squaring a perimeter (L) of each sand particle; dividing the square value ($L^2$) by a project area (A) to obtain a value $L^2/A$; and multiplying the obtained value ($L^2/A$) by ¼π. Note that each surface irregularity is indicated as an average value of 200 sand particles.

(Chemical Components)

Chemical components are measured by a powder compression molding method using an X-ray fluorescence spectrometer (ZSX Primus II manufactured by Rigaku Corporation).

(Porosity)

Porosity is obtained by measuring a test piece made from filling sand sintered by a predetermined method. The test piece is obtained as follows: Filling sand is mixed with 3 wt % of a 1.5 wt % carboxymethyl sodium aqueous solution; the mixture is extruded from a mold to be in the form of a cylinder with φ30×30 mm in height and is dried; and the cylindrically molded product is buried and secured in silica sand comprising 99 wt % or more of an $SiO_2$ component in an alumina fire-resistant crucible and is sintered at 1600° C. for 2 hours in atmospheric air in an electric furnace. The porosity is obtained as follows: A diameter ($\varphi_1$) and a height ($H_1$) of the test piece are measured with a caliper prescribed by JIS B 7507 calipers to obtain an outer volume ($H_1 \times (\varphi_1/2)^2 \times \pi$); a dry weight ($m_1$) and a weight in water ($m_2$) of the test piece are measured as per JIS R 1634 to obtain a volume ($m_1-m_2$) of sand particles of the test piece; the volume ($m_1-m_2$) of these sand particles is subtracted from the outer volume ($H_1 \times \pi \times (\varphi_1/2)^2$) to obtain a pore volume of the test piece; and the pore volume is divided by the outer volume so as to obtain the porosity expressed in percentage.

(Sintered Strength)

Sintered strength is indicated by a value ($f/((\varphi_1/2)^2 \times \pi)$) measured as follows: A value of sintered compressive strength (f)—measured with a universal testing machine (a hydraulic vertical testing machine)—of a test piece made from filling sand sintered by the above-described porosity-measuring method is divided by a cross-sectional area (($\varphi_1/2)^2 \times \pi$) measured from a diameter ($\varphi_1$) of the test piece by using a caliper prescribed by JIS B 7507 calipers.

Example 1

It was ascertained, under the following procedure, how porosity and sintered strength of filling sand are affected by a content ratio of alumina sand and silica sand (both of which have surface irregularities of 1.0, 1.2, 1.3, and 1.45) and by the surface irregularities of the alumina sand. It was also ascertained how porosity and sintered strength of filling sand are affected by a content ratio of chromite sand (whose surface irregularity is 1.3) and the silica sand. Used as raw material sands of the alumina sand, the silica sand, and the chromite sand were alumina artificial sand (Espeal manufactured by Yamakawa Sangyo Co., Ltd., which is ball-shaped and fractural); silica sand (Iide W-5 manufactured by JFE Mineral Co. Ltd.); and chromite sand (Chromite A201 manufactured by Yamakawa Sangyo Co., Ltd.), respectively, all of which are commercially available to be used as molding sands.

The alumina sand, the silica sand, and the chromite sand were subjected to classification processing—dry sieving—so that these sands have the following features: 0.49 mm, 0.43 mm, and 0.35 mm in average particle diameter, respectively; and 1.180 to 0.075 mm, 0.600 to 0.075 mm, and 0.600 to 0.075 mm in particle size distribution, respectively. Moreover, the alumina sand, the silica sand, and the chromite sand have chemical components as below.

TABLE 1

| | Chemical components (wt %) | | | | | | | | |
|---|---|---|---|---|---|---|---|---|---|
| | $Na_2O$ | MgO | $Al_2O_3$ | $SiO_2$ | $K_2O$ | CaO | $Cr_2O_3$ | MnO | $Fe_2O_3$ |
| Silica sand | 0.6 | 0.2 | 2.3 | 95.8 | 0.4 | 0.3 | 0.0 | — | 0.4 |
| Chromite sand | — | 9.4 | 15.1 | 0.7 | — | — | 46.4 | — | 28.4 |
| Alumina sand | 0.1 | 0.3 | 70.8 | 22.0 | 0.7 | 0.7 | 0.1 | — | 2.3 |

The alumina sand, the silica sand, and the chromite sand were mixed to obtain the filling sand under the following conditions: Double-ribbon agitating blades revolved at a revolving speed of 40 rpm for 5 minutes of agitation time.

Results are shown in Table 2 and FIG. 1. In FIG. 1, ◊ indicates the alumina sand having the surface irregularity of 1.0; ♦ indicates the alumina sand having the surface irregularity of 1.2; □ indicates the alumina sand having the surface irregularity of 1.3; ▲ indicates the alumina sand having the surface irregularity of 1.45; and ● indicates the chromite sand.

TABLE 2

| | Porosity (%) | | | | | Sintered strength (kg/cm$^2$) | | | | |
|---|---|---|---|---|---|---|---|---|---|---|
| | Alumina sand | | | | Chromite sand | Alumina sand | | | | Chromite sand |
| | Surface irregularities | | | | | | | | | |
| Vol. pct. (vol %) | 1.0 | 1.2 | 1.3 | 1.45 | 1.3 | 1.0 | 1.2 | 1.3 | 1.45 | 1.3 |
| 0 | 50.0 | 50.0 | 50.0 | 50.0 | 50.0 | 6.0 | 6.0 | 6.0 | 6.0 | 6.0 |
| 10 | 39.5 | 40.6 | 42.3 | 45.8 | 43.3 | 57.2 | 57.0 | 57.5 | 49.4 | 73.7 |
| 20 | 31.4 | 32.8 | 35.3 | 40.4 | 38.3 | 102.8 | 102.0 | 98.0 | 83.8 | 137.3 |
| 30 | 25.1 | 27.0 | 30.6 | 37.7 | 34.5 | 139.2 | 135.0 | 126.4 | 106.2 | 195.2 |
| 40 | 20.8 | 23.5 | 27.6 | 36.2 | 31.9 | 165.2 | 155.8 | 143.0 | 117.7 | 242.6 |
| 50 | 18.6 | 20.6 | 25.5 | 36.0 | 30.7 | 179.4 | 168.0 | 148.3 | 119.4 | 274.7 |
| 60 | 18.4 | 20.4 | 24.0 | 36.8 | 30.7 | 180.6 | 171.7 | 143.0 | 112.3 | 286.6 |
| 70 | 20.2 | 22.9 | 26.8 | 38.5 | 32.0 | 167.5 | 155.6 | 130.0 | 97.6 | 273.7 |
| 80 | 23.9 | 25.5 | 29.2 | 41.2 | 34.6 | 138.9 | 127.1 | 105.4 | 76.3 | 231.1 |
| 90 | 29.6 | 31.8 | 36.5 | 45.8 | 38.6 | 93.5 | 87.5 | 72.0 | 49.5 | 154.0 |
| 100 | 37.2 | 38.3 | 41.5 | 48.7 | 43.8 | 46.0 | 42.0 | 33.5 | 18.2 | 37.5 |

In FIG. 2, a relation between the surface irregularities of the alumina sand and the porosity of the filling sand is shown in view of the values indicated in Table 2. In FIG. 3, a relation between the surface irregularities of the alumina sand and the sintered strength of the filling sand is shown in view of the values indicated in Table 2. It is evident from Table 2 and FIG. 1 that the filling sand comprising the alumina sand has a tendency to be lower in sintered strength than the filling sand comprising the chromite sand. It is also evident that the lower surface irregularities of the alumina sand have a tendency to make the sintered strength of the filling sand lower, provided that the porosity of the filling sand is consistent.

It is evident from Table 2 and FIG. 2 that the filling sand has a tendency to decrease the porosity, provided that the content ratio of the alumina sand is within a range from 20 to 90 vol % and that the surface irregularities of the alumina sand are 1.3 or less. As shown in Table 2 and FIG. 3, it is ascertained that the alumina sand having the high surface irregularities has a tendency to decrease the sintered strength of the filling sand. It is, however, ascertained from Example 3 (comparison sand 1) and Example 4 (comparison sand 3) below that the filling sand having the high surface irregularities has difficulty in increasing a free opening ratio because this filling sand increases its porosity.

Example 2

It was ascertained how porosity and sintered strength of filling sand are affected by a content ratio of alumina sand and silica sand and by an amount of $Fe_2O_3$ in the alumina sand. The filling sand and test piece were prepared in the same manner as Example 1, and the porosity and the sintered strength of the filling sand were measured also in the same manner as Example 1. Used as the silica sand in Example 2 was the one used in Example 1. Used as the alumina sand was alumina artificial sand prepared from an alumina raw material different in amount of $Fe_2O_3$ by a melting and air-granulation method. This alumina sand comprises chemical components indicated in Table 3 and has the following features: surface irregularity of 1.2; 0.49 mm in average particle diameter; and 1.180 to 0.075 mm in particle size distribution.

TABLE 3

| Amt. (wt %) of Fe$_2$O$_3$ in | Chemical components (wt %) | | | | | | | |
|---|---|---|---|---|---|---|---|---|
| alumina sand | Na$_2$O | MgO | Al$_2$O$_3$ | SiO$_2$ | K$_2$O | CaO | Cr$_2$O$_3$ | MnO | Fe$_2$O$_3$ |
| 2.3 | 0.1 | 0.3 | 70.8 | 22.0 | 0.7 | 0.7 | 0.1 | — | 2.3 |
| 3.5 | 0.1 | 2.3 | 72.2 | 17.6 | 0.6 | 0.4 | 0.1 | — | 3.5 |
| 5.3 | 0.1 | 1.4 | 73.1 | 15.6 | 0.4 | 0.4 | 0.1 | — | 5.3 |
| 8.2 | 0.1 | 0.5 | 74.5 | 12.4 | 0.3 | 0.3 | 0.1 | — | 8.2 |
| 10.5 | 0.1 | 0.4 | 72.8 | 11.4 | 1.0 | 0.5 | 0.1 | — | 10.5 |
| 12.1 | 0.1 | 0.2 | 64.5 | 19.2 | 0.4 | 0.4 | 0.1 | — | 12.1 |

Results are shown in Table 4.

TABLE 4

| | Porosity (%) | | | | | | Sintered strength (kg/cm$^2$) | | | | | |
|---|---|---|---|---|---|---|---|---|---|---|---|---|
| | Amt. (wt %) of Fe$_2$O$_3$ | | | | | | | | | | | |
| Vol. pct. (vol %) | 2.3 | 3.5 | 5.3 | 8.2 | 10.5 | 12.1 | 2.3 | 3.5 | 5.3 | 8.2 | 10.5 | 12.1 |
| 0 | 50.0 | 50.0 | 50.0 | 50.0 | 50.0 | 50.0 | 6.0 | 6.0 | 6.0 | 6.0 | 6.0 | 6.0 |
| 10 | 39.5 | 39.0 | 38.8 | 38.0 | 36.0 | 33.7 | 57.2 | 60.0 | 64.0 | 78.2 | 98.1 | 130.1 |
| 20 | 31.4 | 31.1 | 30.6 | 30.0 | 27.2 | 22.8 | 102.8 | 107.0 | 115.0 | 135.4 | 175.2 | 231.9 |
| 30 | 25.1 | 24.6 | 24.4 | 22.6 | 19.3 | 16.3 | 139.2 | 139.0 | 145.0 | 175.6 | 235.8 | 313.1 |
| 40 | 20.8 | 20.5 | 19.9 | 19.3 | 16.1 | 13.3 | 165.2 | 167.0 | 170.0 | 200.1 | 280.9 | 376.8 |
| 50 | 18.6 | 18.1 | 17.9 | 17.1 | 15.4 | 13.0 | 179.4 | 184.0 | 182.0 | 210.1 | 311.2 | 426.1 |
| 60 | 18.4 | 18.5 | 18.4 | 17.8 | 16.9 | 14.3 | 180.6 | 182.0 | 184.0 | 206.7 | 327.6 | 464.3 |
| 70 | 20.2 | 20.2 | 20.4 | 19.6 | 18.2 | 15.1 | 167.5 | 172.0 | 175.8 | 191.1 | 331.2 | 494.5 |
| 80 | 23.9 | 24.1 | 23.7 | 23.0 | 20.5 | 17.7 | 138.9 | 140.9 | 142.2 | 164.7 | 322.6 | 519.9 |
| 90 | 29.6 | 29.4 | 29.3 | 28.2 | 24.4 | 19.4 | 93.5 | 99.0 | 103.0 | 128.4 | 302.9 | 543.5 |
| 100 | 37.2 | 36.9 | 36.3 | 33.4 | 26.7 | 20.4 | 30.0 | 29.8 | 33.1 | 83.7 | 272.9 | 568.7 |

In FIG. 4, a relation between the amount of Fe$_2$O$_3$ in the alumina sand and the porosity of the filling sand is shown in view of the values indicated in Table 4. In FIG. 5, a relation between the amount of Fe$_2$O$_3$ in the alumina sand and the sintered strength of the filling sand is shown in view of the values indicated in Table 4.

It is evident from FIG. 4 that the filling sand has a tendency to decrease the porosity, provided that the content ratio of the alumina sand is within a range from 20 to 90 vol % and that the amount of Fe$_2$O$_3$ in the alumina sand exceeds 8 wt %. It is, however, evident from FIG. 5 that the higher amount of Fe$_2$O$_3$ in the alumina sand has a tendency to make the sintered strength of the filling sand higher.

Example 3

Filling sand (implementation sand 1) was prepared that comprises the alumina sand (having the surface irregularity of 1.2) and silica sand, used in Example 1. The alumina sand and the silica sand were configured to have a content ratio of 25 vol % and 75 vol %. A sliding nozzle (having an internal diameter of 50 mmφ) installed at a bottom of a ladle with a capacity of 100 t was filled with 30 kg of the filling sand. A free opening ratio of the filling sand was measured after molten common steel was retained in the ladle for about 50 minutes at an average tapping temperature of 1630° C. The alumina sand (having the surface irregularity of 1.2) used in Example 1 was mixed with the silica sand used in Example 1 by using double-ribbon agitating blades at a revolving speed of 40 rpm for 5 minutes of agitation time (the content ratio of the alumina sand and the silica sand was 25 vol % and 75 vol %). The filling sand was charged with a potential of about −0.4 kV and was poured into a mixing vessel with granular carbon black (having about 2,000 μm or less of particle size distribution and manufactured by NSCC Carbon Co., Ltd.); and the mixture was stirred (at a revolving speed of 40 rpm for 5 minutes of agitation time) to obtain 0.5 wt % of carbon-coated filling sand (implementation sand 2).

Two other filling sands were also prepared: filling sand (comparison sand 1) comprising the alumina sand (having the surface irregularity of 1.45) and silica sand, used in Example 1; and filling sand (comparison sand 2) comprising chromite sand and silica sand, used in Example 1. The alumina sand and the silica sand in comparison sand 1 were configured to have a content ratio of 25 vol % and 75 vol %, and the chromite sand and the silica sand in comparison sand 2 were also configured to have a content ratio of 25 vol % and 75 vol %. A free opening ratio of each of these filling sands was measured in the same manner as above.

Results are shown in Table 5.

TABLE 5

| | Total filling times | non-opening times | Free opening ratio (%) |
|---|---|---|---|
| Implementation sand 1 | 124 | 1 | 99.2 |
| Implementation sand 2 | 131 | 0 | 100.0 |
| Comparison sand 1 | 127 | 5 | 96.1 |
| Comparison sand 2 | 133 | 5 | 96.2 |

It is evident that the implementation sands comprising the alumina sand—having the specific surface irregularity and comprising the specific components—and the silica sand at the specific ratio function as excellent filling sands for sliding nozzle because these filling sands are greatly low to make the non-opening. It is also evident that the carbon-coated filling sand is capable of increasing its free opening ratio.

Example 4

Filling sand (implementation sand 3) was prepared that comprises the alumina sand (having the surface irregularity of 1.2) and silica sand, used in Example 1. The alumina sand and the silica sand were configured to have a content ratio of 70 vol % and 30 vol %. A sliding nozzle (having an internal diameter of 40 mmφ) installed at a bottom of a ladle with a capacity of 80 t was filled with 25 kg of the filling sand. A free opening ratio of the filling sand was measured after molten stainless steel was retained in the ladle for about 150 minutes at an average tapping temperature of 1680° C.

Two other filling sands were also prepared: filling sand (comparison sand 3) comprising the alumina sand (having the surface irregularity of 1.45) and silica sand, used in Example 1; and filling sand (comparison sand 4) comprising chromite sand and silica sand, used in Example 1. The alumina sand and the silica sand in comparison sand 3 were configured to have a content ratio of 70 vol % and 30 vol %, and the chromite sand and the silica sand in comparison sand 4 were also configured to have a content ratio of 70 vol % and 30 vol %. A free opening ratio of each of these filling sands was measured in the same manner as above.

Results are shown in Table 6.

TABLE 6

| | Total filling times | non-opening times | Free opening ratio (%) |
|---|---|---|---|
| Implementation sand 3 | 106 | 0 | 100.0 |
| Comparison sand 3 | 105 | 8 | 92.4 |
| Comparison sand 4 | 127 | 6 | 95.3 |

It is evident that the implementation sand comprising the alumina sand—having the specific surface irregularity and comprising the specific components—and the silica sand at the specific ratio functions as excellent filling sand because this filling sand is greatly low to make the non-opening even after being retained for a relatively long period of time.

Example 5

It was ascertained how a fragmentation rate of filling sand is affected by an amount of $Al_2O_3$ in alumina sand. The fragmentation rate was measured as follows.

(Fragmentation Rate)

To measure the fragmentation rate, a test piece is used that is made from the alumina sand sintered by a predetermined method. The test piece is obtained as follows: 20 g of alumina sand is poured into an alumina fire-resistant crucible with φ46×36 mm in height and is sintered at 1550° C. for 30 minutes in atmospheric air in an electric furnace. In the case where the test piece is fused with the alumina fire-resistant crucible and is difficult to remove from the alumina fire-resistant crucible, the alumina fire-resistant crucible is broken down by a hammer or the like so as to remove the test piece. In the case where the alumina sand is not sintered in the alumina fire-resistant crucible and remains fine, the fine alumina sand is considered as the test piece. The fragmentation rate of the filling sand is obtained as follows: Measuring a weight ($m_1$) of the obtained test piece (including the fine alumina sand); sifting the test piece through a metal sieve having a 1.7-mm mesh by shaking and tapping the sieve with use of Ro-tap type sifting machine for 2 minutes—the sieve is a test sieve I prescribed by JIS Z 8801-1; measuring a weight ($m_2$) of the remaining test piece left on the test sieve having the 1.7-mm mesh; and dividing a weight difference ($m_1-m_2$)—obtained from the weight of the test piece before the shaking and tapping process and the weight of the remaining test piece—by the weight ($m_1$) of the test piece so as to obtain the fragmentation rate expressed in percentage.

Table 7 shows content ratios of chemical components in 11 types of the alumina sand.

TABLE 7

| Chemical components (wt %) | | | |
|---|---|---|---|
| $Al_2O_3$ | $SiO_2$ | $Fe_2O_3$ | Fragmentation rate (%) |
| 40.0 | 43.2 | 6.7 | 20.6 |
| 50.0 | 38.1 | 3.5 | 30.0 |
| 55.0 | 38.2 | 2.3 | 35.1 |
| 60.0 | 31.7 | 3.2 | 40.8 |
| 65.0 | 27.9 | 2.2 | 52.0 |
| 70.0 | 23.4 | 2.4 | 66.9 |
| 71.0 | 22.3 | 2.6 | 69.2 |
| 72.0 | 21.6 | 2.2 | 67.4 |
| 73.0 | 21.1 | 1.9 | 64.1 |
| 74.0 | 19.1 | 2.5 | 51.4 |
| 75.0 | 18.7 | 2.1 | 36.7 |

Table 8 shows the fragmentation rates. FIG. 6 shows a graph where the horizontal axis indicates the amounts of $Al_2O_3$; and the vertical axis indicates the fragmentation rates, in view of Table 8.

TABLE 8

| Amt. of $Al_2O_3$ (wt %) | Fragmentation rate (%) |
|---|---|
| 40.0 | 20.6 |
| 50.0 | 30.0 |
| 55.0 | 35.1 |
| 60.0 | 40.8 |
| 65.0 | 52.0 |
| 70.0 | 66.9 |
| 71.0 | 69.2 |
| 72.0 | 67.4 |
| 73.0 | 64.1 |
| 74.0 | 51.4 |
| 75.0 | 36.7 |

It is evident from Table 8 and FIG. 6 that the filling sand comprising 50 wt % or more of $Al_2O_3$ is high in fragmentation rate.

The invention claimed is:

1. An alumina-based filling sand for sliding nozzle comprising at least 50 wt % of mixed sand including 20 to 50 vol % of alumina sand and 80 to 50 vol % of silica sand, wherein the alumina sand has surface irregularities value of 1.3 or less and comprises 50 wt % or more of an $Al_2O_3$ component.

2. The alumina-based filling sand for sliding nozzle of claim 1, wherein the alumina sand has 8 wt % or less of $Fe_2O_3$.

3. The alumina-based filling sand for sliding nozzle of claim 1, wherein the alumina sand has an average particle diameter within a range from 0.2 to 1.0 mm.

4. The alumina-based filling sand for sliding nozzle of claim 1, wherein the silica sand had an average particle diameter within a range from 0.2 to 1.0 mm.

5. The alumina-based filling sand for sliding nozzle of claim 1, wherein the silica sand and the alumina sand both are coated with carbon, or either the silica sand or the alumina sand is coated with carbon.

6. The alumina-based filling sand for sliding nozzle of claim 1, wherein the alumina sand has surface irregularities of 1.2 or less.

7. The alumina-based filling sand for sliding nozzle of claim 1, wherein the alumina sand comprises a plurality of sand particles, and wherein the surface irregularities value of the alumina sand is obtained by analyzing two-dimensional projections of the plurality of sand particles, wherein the analyzing comprises projecting an image of each of the plurality of sand particles to make a surface irregularities value calculation as follows:

squaring a perimeter (L) of each sand particle to obtain a square value ($L^2$);

dividing the square value ($L^2$) by a project area (A) to obtain a value $L^2/A$; and multiplying the obtained value ($L^2/A$) by $1/4\pi$.

* * * * *